(12) United States Patent
Jung et al.

(10) Patent No.: US 11,161,335 B2
(45) Date of Patent: Nov. 2, 2021

(54) MANUFACTURING APPARATUS OF DISPLAY DEVICE AND MANUFACTURING METHOD OF DISPLAY DEVICE

(71) Applicant: Samsung Display Co., Ltd., Yongin-si (KR)

(72) Inventors: Jiwon Jung, Seoul (KR); Youngji Kim, Hwaseong-si (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/874,221

(22) Filed: May 14, 2020

(65) Prior Publication Data

US 2020/0391498 A1 Dec. 17, 2020

(30) Foreign Application Priority Data

Jun. 17, 2019 (KR) .................. 10-2019-0071323

(51) Int. Cl.
| | |
|---|---|
| *B32B 43/00* | (2006.01) |
| *G02B 1/14* | (2015.01) |
| *B29C 63/00* | (2006.01) |
| *G06F 1/16* | (2006.01) |
| *B32B 38/10* | (2006.01) |

(52) U.S. Cl.
CPC ........ *B32B 43/006* (2013.01); *B29C 63/0013* (2013.01); *B32B 43/003* (2013.01); *G02B 1/14* (2015.01); *G06F 1/1609* (2013.01); *B32B 38/10* (2013.01); *B32B 2457/206* (2013.01); *Y10S 156/934* (2013.01); *Y10S 156/937* (2013.01); *Y10T 156/11* (2015.01); *Y10T 156/19* (2015.01)

(58) Field of Classification Search
CPC ..... B32B 38/10; B32B 43/006; Y10T 156/11; Y10T 156/19; Y10S 156/934; Y10S 156/937
See application file for complete search history.

(56) References Cited

U.S. PATENT DOCUMENTS

| | | | | |
|---|---|---|---|---|
| 5,282,918 A | * | 2/1994 | Heist ...................... | B26D 3/282 156/765 |
| 6,227,276 B1 | * | 5/2001 | Kim .................... | B29C 63/0013 156/763 |
| 6,767,426 B1 | * | 7/2004 | Yamamoto ........ | H01L 21/67092 156/270 |
| 8,171,977 B2 | * | 5/2012 | Kobayashi ........ | H01L 21/67132 156/760 |

(Continued)

FOREIGN PATENT DOCUMENTS

| | | |
|---|---|---|
| KR | 10-0969626 B1 | 7/2010 |
| KR | 10-2014-0031005 A | 3/2014 |

(Continued)

*Primary Examiner* — Philip C Tucker
*Assistant Examiner* — Nickolas R Harm
(74) *Attorney, Agent, or Firm* — Lewis Roca Rothgerber Christie LLP

(57) ABSTRACT

A manufacturing apparatus of a display device includes: a stage to support a work substrate covered by a work protective film; a separation module including a separation structure, and a pressure sensor to measure an intensity of a pressure applied to the separation structure; a driver to control a position of the separation module; and a controller to control the separation module and the driver.

20 Claims, 10 Drawing Sheets

(56) References Cited

U.S. PATENT DOCUMENTS

| | | | |
|---|---|---|---|
| 8,888,953 B2* | 11/2014 | Teck | B26D 3/28 |
| | | | 156/703 |
| 8,991,463 B2 | 3/2015 | Jeong et al. | |
| 9,434,148 B2* | 9/2016 | Posarelli | B32B 43/006 |
| 9,576,854 B2* | 2/2017 | Itou | H01L 21/78 |
| 9,902,584 B2* | 2/2018 | Kramer | B32B 43/006 |
| 10,081,173 B2 | 9/2018 | Choi et al. | |
| 10,279,576 B2* | 5/2019 | Hirakata | B32B 37/12 |
| 10,406,799 B1* | 9/2019 | Zhou | B32B 43/006 |
| 10,608,209 B2* | 3/2020 | Cheon | H01L 51/0031 |
| 2002/0094760 A1* | 7/2002 | Lim | B29C 63/0013 |
| | | | 451/41 |
| 2004/0144487 A1* | 7/2004 | Martinez | B28D 5/0082 |
| | | | 156/765 |
| 2007/0235131 A1* | 10/2007 | Tsujimoto | H01L 21/68714 |
| | | | 156/714 |
| 2008/0185100 A1* | 8/2008 | Jang | G02F 1/1303 |
| | | | 156/714 |
| 2009/0314430 A1* | 12/2009 | Nakamura | H01L 21/6838 |
| | | | 156/703 |
| 2014/0076500 A1* | 3/2014 | Honda | B32B 43/006 |
| | | | 156/750 |
| 2015/0059986 A1* | 3/2015 | Komatsu | C03B 33/027 |
| | | | 156/510 |
| 2015/0059987 A1* | 3/2015 | Kumakura | H01L 51/56 |
| | | | 156/714 |
| 2015/0318200 A1* | 11/2015 | Ohno | H01L 21/67092 |
| | | | 414/797 |
| 2018/0147825 A1* | 5/2018 | Tsao | H01L 21/67092 |
| 2018/0290344 A1 | 10/2018 | Hsieh et al. | |

FOREIGN PATENT DOCUMENTS

| | | |
|---|---|---|
| KR | 10-2017-0137268 A | 12/2017 |
| KR | 10-2020-0060654 A | 6/2020 |
| KR | 10-2020-0060655 A | 6/2020 |

\* cited by examiner

MANUFACTURING APPARATUS OF DISPLAY DEVICE AND MANUFACTURING METHOD OF DISPLAY DEVICE

CROSS-REFERENCE TO RELATED APPLICATION

This application claims priority to and the benefit of Korean Patent Application No. 10-2019-0071323, filed on Jun. 17, 2019, the entire content of which is incorporated by reference herein.

BACKGROUND

1. Field

Aspects of one or more exemplary embodiments of the present disclosure relate to a manufacturing apparatus of a display device, and a manufacturing method of the display device. More particularly, aspects of one or more exemplary embodiments of the present disclosure relate to a manufacturing apparatus of a display device that may be used to remove a protective film, and a manufacturing method of the display device using the manufacturing apparatus.

2. Description of the Related Art

Various display devices, which are applied to multimedia devices, such as televisions, mobile phones, tablet computers, navigation devices, game devices, and the like, are being developed. The display devices include various functional members, such as a display module, an input sensor, a window, and an optical film.

The functional members are manufactured or processed, and are coupled to each other. A display device having a stacked structure is manufactured through a plurality of coupling processes.

The above information disclosed in this Background section is for enhancement of understanding of the background of the present disclosure, and therefore, it may contain information that does not constitute prior art.

SUMMARY

One or more exemplary embodiments of the present disclosure are directed to a manufacturing apparatus of a display device, which may be capable of reducing a defect rate in a manufacturing process of the display device.

One or more exemplary embodiments of the present disclosure are directed to a manufacturing method of the display device using the manufacturing apparatus.

According to an exemplary embodiment of the present disclosure, a manufacturing apparatus of a display device, includes: a stage to support a work substrate covered by a work protective film; a separation module including a separation structure, and a pressure sensor to measure an intensity of a pressure applied to the separation structure; a driver to control a position of the separation module; and a controller to control the separation module and the driver.

In an exemplary embodiment, the work substrate may include a plurality of cell areas, and a peripheral area adjacent to the cell areas.

In an exemplary embodiment, each of the cell areas may include a base layer, a circuit element layer, a display element layer, and an encapsulation layer.

In an exemplary embodiment, an adhesive layer may be between the work protective film and the work substrate.

In an exemplary embodiment, a cutting line may be defined in the work protective film.

In an exemplary embodiment, the cutting line may extend to the adhesive layer.

In an exemplary embodiment, the work protective film may be divided into a plurality of areas by the cutting line.

In an exemplary embodiment, the pressure sensor may include a piezoelectric element.

In an exemplary embodiment, the controller may be configured to: receive a sensing signal indicating the intensity of the pressure from the pressure sensor; and control a position of the driver in a vertical direction according to the sensing signal.

In an exemplary embodiment, the controller may be configured to move the driver in a horizontal direction when the intensity of the pressure is within a predetermined range.

According to an exemplary embodiment of the present disclosure, a method of manufacturing a display device, includes: providing a work substrate covered by a work protective film; moving a separation module in a vertical direction, the separation module including a separation structure, and a pressure sensor to measure an intensity of a pressure applied to the separation structure; measuring the intensity of the pressure; stopping the movement of the separation module in the vertical direction when the intensity of the pressure is equal to or greater than a reference value; and moving the separation module in a horizontal direction.

In an exemplary embodiment, the work substrate may include a plurality of cell areas, and a peripheral area adjacent to the cell areas; the work protective film may include a plurality of unit areas corresponding to the cell areas, and a boundary area corresponding to the peripheral area, the plurality of unit areas and the boundary area being divided by a cutting line; and the boundary area of the work protective film may be removed according to the moving of the separation module in the horizontal direction.

In an exemplary embodiment, the boundary area may include a plurality of areas.

In an exemplary embodiment, the method may further include cutting the work substrate to divide the work substrate into a plurality of cell areas of the work substrate.

According to an exemplary embodiment of the present disclosure, a manufacturing apparatus of a display device, includes: a stage to support a work substrate covered by a work protective film; a pressing module including a pressing member, and a pressure sensor to measure an intensity of a pressure applied to the pressing member; a first driver to control a position of the pressing module; a separation structure; a second driver to control a position of the separation structure; and a controller to control the pressure sensor, the first driver, and the second driver.

In an exemplary embodiment, the work substrate may include a plurality of cell areas, and a peripheral area adjacent to the cell areas; and the pressing module may include a plurality of pressing modules corresponding to at least some of the cell areas.

In an exemplary embodiment, the work protective film may be divided into a plurality of areas by a cutting line.

In an exemplary embodiment, the pressure sensor may include a piezoelectric element.

In an exemplary embodiment, the controller may be configured to: receive a sensing signal indicating the intensity of the pressure from the pressure sensor; and control a position of the first driver in a vertical direction according to the sensing signal.

In an exemplary embodiment, the controller may be configured to move the second driver when the first driver is stopped in the vertical direction.

According to one or more exemplary embodiments of the present disclosure, the intensity of the pressure applied to the separation structure may be measured after the separation structure contacts (e.g., makes contact with) the work substrate. The separation structure may be disposed (e.g., may be accurately disposed) at a target position at each separation point, even though a stage may not be flat. The target position may be set in a desired or suitable direction (e.g., the vertical direction). The work substrate may be prevented or substantially prevented from being applied with an overpressure caused by the separation structure. The separation structure may be disposed at a position at (e.g., in or on) a desired or suitable direction (e.g., the vertical direction), which may sufficiently separate the protective film.

According to one or more exemplary embodiments of the present disclosure, the pressing module may be disposed at (e.g., in or on) areas (e.g., at unit areas) of the work protective film. The areas at (e.g., in or on) which the pressing module of the work protective film is disposed may overlap with the cell areas, respectively. The unit areas may not be separated when the boundary area of the work protective film is removed, because the pressing module may press the unit areas. The pressure applied to the work substrate may be monitored (e.g., may be continuously monitored) such that the work substrate may not be excessively pressed (e.g., may not be overly pressed) by the pressing module.

BRIEF DESCRIPTION OF THE DRAWINGS

The above and other aspects and features of the present disclosure will become more apparent to those skilled in the art from the following detailed description of the exemplary embodiments with reference to the accompanying drawings, wherein.

DETAILED DESCRIPTION

Figure 1:
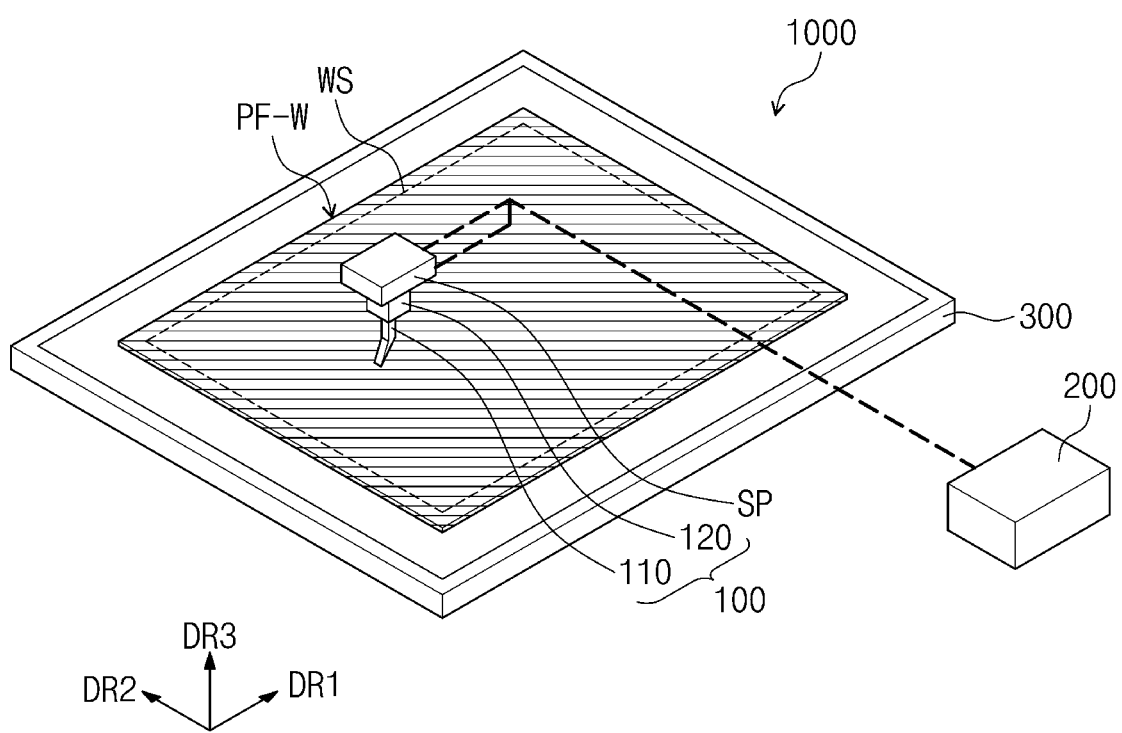
FIG. 1 is a perspective view showing a manufacturing apparatus of a display device according to an exemplary embodiment of the present disclosure.

Hereinafter, example embodiments will be described in more detail with reference to the accompanying drawings, in which like reference numbers refer to like elements throughout. The present disclosure, however, may be embodied in various different forms, and should not be construed as being limited to only the illustrated embodiments herein. Rather, these embodiments are provided as examples so that this disclosure will be thorough and complete, and will fully convey the aspects and features of the present disclosure to those skilled in the art. Accordingly, processes, elements, and techniques that are not necessary to those having ordinary skill in the art for a complete understanding of the aspects and features of the present disclosure may not be described. Unless otherwise noted, like reference numerals denote like elements throughout the attached drawings and the written description, and thus, descriptions thereof may not be repeated.

In the drawings, the relative sizes of elements, layers, and regions may be exaggerated and/or simplified for clarity. Spatially relative terms, such as "beneath," "below," "lower," "under," "above," "upper," and the like, may be used herein for ease of explanation to describe one element or feature's relationship to another element(s) or feature(s) as illustrated in the figures. It will be understood that the spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present disclosure.

It will be understood that when an element or layer is referred to as being "on," "connected to," or "coupled to" another element or layer, it can be directly on, connected to, or coupled to the other element or layer, or one or more intervening elements or layers may be present. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments and is not intended to be limiting of the present disclosure. As used herein, the singular forms "a" and "an" are intended to include the plural forms as well, unless the context clearly indicates otherwise. It will be further understood that the terms "comprises," "comprising," "includes," and "including," "has," "have," and "having," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list.

As used herein, the term "substantially," "about," and similar terms are used as terms of approximation and not as terms of degree, and are intended to account for the inherent variations in measured or calculated values that would be recognized by those of ordinary skill in the art. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

Unless otherwise defined, all terms (including technical and scientific terms) used herein have the same meaning as commonly understood by one of ordinary skill in the art to which the present disclosure belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Figure 2A:
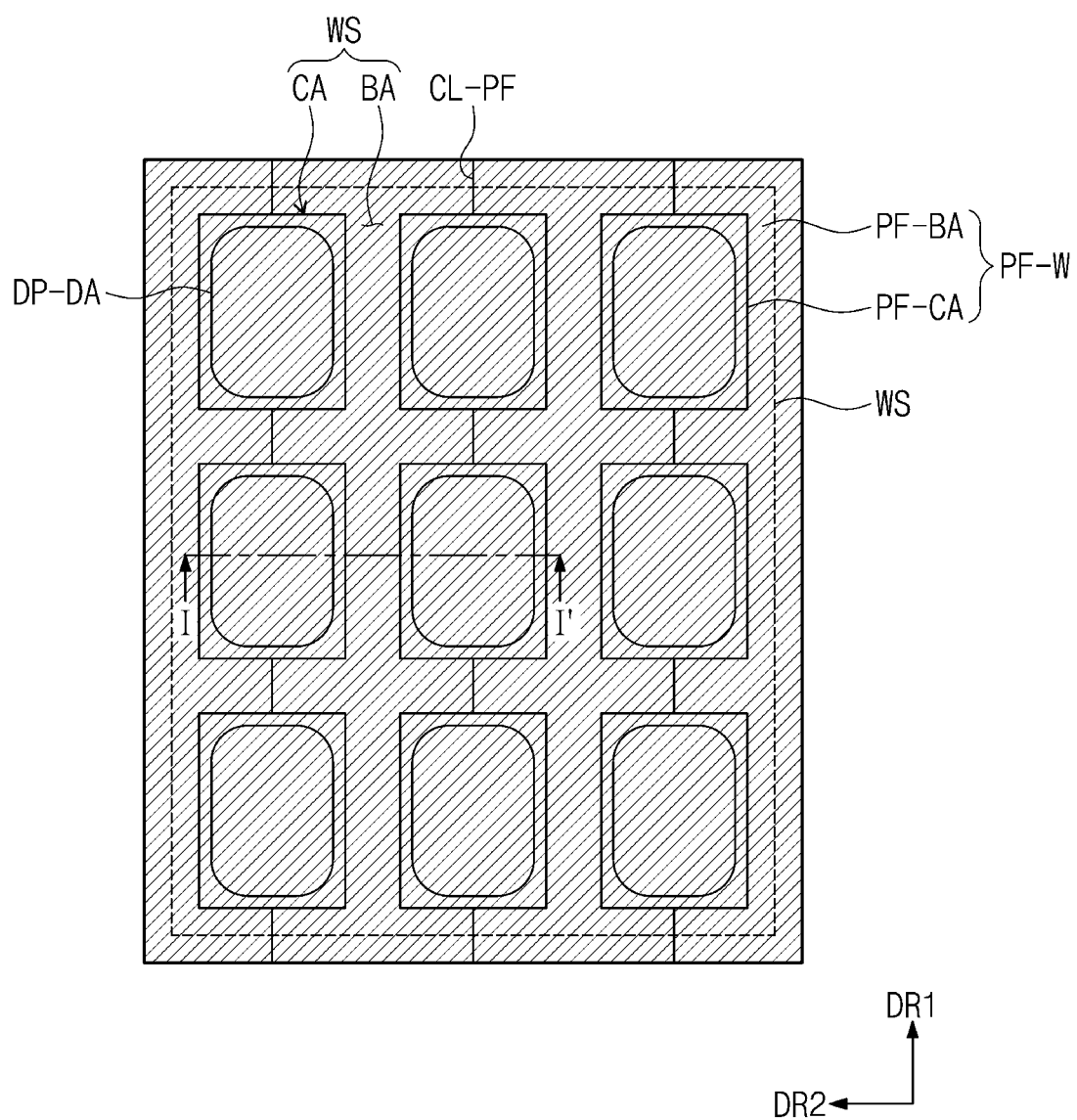
FIG. 2A is a plan view showing a work substrate according to an exemplary embodiment of the present disclosure.
Figure 2B:
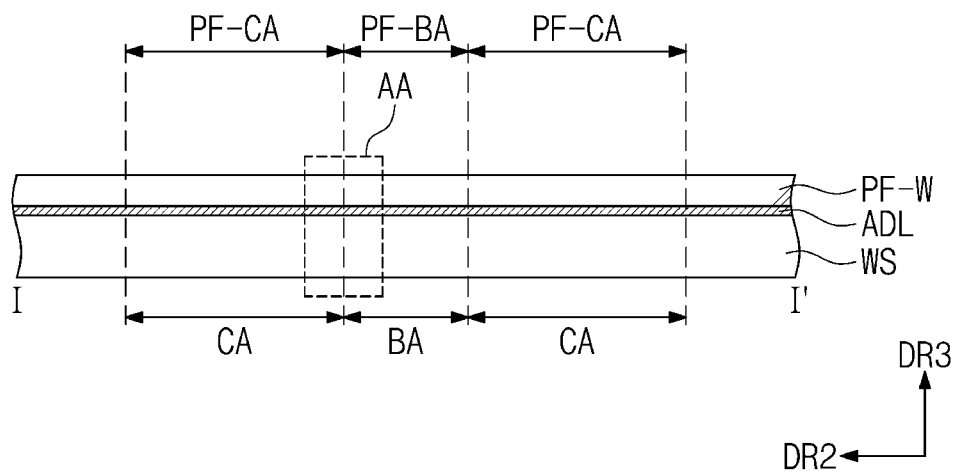
FIG. 2B is a cross-sectional view taken along the line I-I' of FIG. 2A.
Figure 2C:
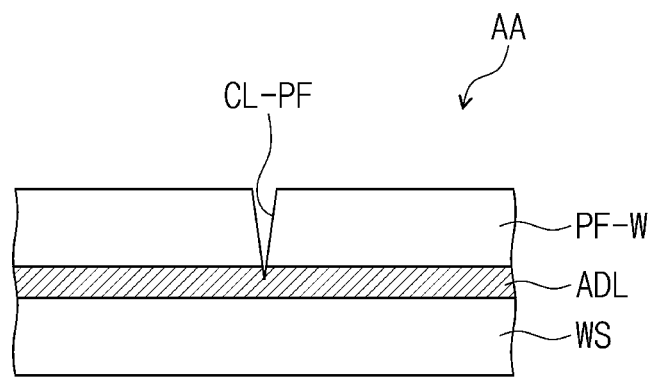
FIG. 2C is an enlarged view of the area AA of FIG. 2B.

FIG. 1 is a perspective view showing a manufacturing apparatus 1000 of a display device according to an exemplary embodiment of the present disclosure. FIG. 2A is a plan view showing a work substrate WS according to an exemplary embodiment of the present disclosure. FIG. 2B is a cross-sectional view taken along the line I-I' of FIG. 2A. FIG. 2C is an enlarged view of the area AA of FIG. 2B. As used herein, a plan view may be a view from a plane that is parallel to or substantially parallel to (e.g., normal to) a surface (e.g., a top surface) of the relevant component, element, or layer (e.g., the display device, the work substrate, and/or the like).

The manufacturing apparatus 1000 according to the present exemplary embodiment includes a separation module (e.g., a separator) 100, a driver SP, a controller 200, and a stage 300. In FIG. 1, a connection relationship between the controller 200, the separation module 100, and the driver SP is shown schematically, and the connection relationship therebetween according to the present exemplary embodiment may include any suitable connections to communicate data and/or electrical signals between the controller 200, the separation module 100, and/or the driver SP. For example, in various embodiments, the separation module 100 and the driver SP may be connected to the controller 200 via a cable or via a wireless communication module (e.g., via a wireless communication connection or a wireless communication link) to transmit and receive electrical signals to and from the controller 200.

The separation module 100 may include a separation structure 110, and a pressure sensor 120 to measure an intensity of pressure (or an intensity of force) that may be applied to the separation structure 110. The separation structure 110 is a structure that may stick (e.g., prick, poke, and/or snag) a synthetic resin film and/or that may apply a friction to the synthetic resin film. For example, in various embodiments, the separation structure 110 may include (or may be) a plastic pin, a plastic plate, a metal pin, a metal plate, and/or the like. The separation structure 110 may be coupled to the pressure sensor 120.

The pressure sensor 120 may sense the pressure that is applied to the separation structure 110. For example, the pressure sensor 120 may receive the same or substantially the same pressure that is applied to the separation structure 110. The pressure sensor 120 may include, for example, a piezoelectric element that generates an electrical signal corresponding to the pressure applied thereto. In addition, the pressure sensor 120 may include one or more materials in which a resistance changes in response to the pressure applied thereto. For example, the pressure sensor 120 may include a carbon powder, a quantum tunneling composite (QTC), silver nanoparticles, a single crystalline or polycrystalline silicon, electroactive polymers, and/or the like. In some embodiments, the pressure sensor 120 may include (or may be formed of) one or more of a carbon nanotube, graphene, a metal nanowire, and/or the like, because the carbon nanotube, the graphene, the metal nanowire, and/or the like may be flexible and may have a resistance that varies depending on the pressure applied thereto.

The separation module 100 is coupled to the driver SP. The driver SP controls a position of the separation module 100. The driver SP may include (or may be) a mechanical structure that may control various positions of the separation module 100 in any suitable or desired directions (e.g., in a vertical direction, a horizontal direction, and/or the like). For example, in an embodiment, the driver SP may control the position of the separation module 100 by moving the separation module in the vertical direction and the horizontal direction. The driver SP may include (or may be) a mechanical structure, for example, such as a robot arm.

The controller 200 controls the driver SP and the pressure sensor 120. The controller 200 controls an operation of the driver SP, and receives a sensing signal that indicates the intensity of the pressure from the pressure sensor 120. The controller 200 may include a computer system. For example, the controller 200 may include one or more processors, and memory connected to the one or more processors and storing instructions that are executed by the one or more processors to perform the various functions of the controller 200. The controller 200 may control the driver SP in response to a user input, and may provide the user with the sensing signal in any suitable manner (e.g., in a predetermined manner).

The stage 300 supports the work substrate WS. The work substrate WS may be covered by a work protective film PF-W. In FIG. 1, the work protective film PF-W is shown as having an area that is larger than that of the work substrate WS, but the present disclosure is not limited thereto, and the area of the work protective film PF-W may be sufficient when the work protective film PF-W is able to protect the work substrate WS. For example, in another embodiment, the work protective film PF-W may have the same or substantially the same area as that of the work substrate WS. The work protective film PF-W may include a plastic film, for example, such as polyethylene terephthalate (PET) and/or the like, but the present disclosure is not limited thereto.

Referring to FIG. 2A, the work substrate WS includes a plurality of cell areas CA. For example, FIG. 2A shows the cell areas CA arranged in a 3 by 3 matrix as a representative example, but the present disclosure is not limited thereto, and the work substrate WS may include any suitable number and/or arrangement of the cell areas CA.

The cell areas CA may be spaced apart (e.g., may be separated) from each other, and each of the cell areas CA may form a display module or a display panel. The display module may include the display panel, and may further include at least one of an input sensor and an optical film in addition to the display panel. In FIG. 2A, a display area DP-DA of the display panel is defined at (e.g., in or on) the cell area CA. The display area DP-DA corresponds an area at (e.g., in or on) which pixels of the display panel are arranged.

The work substrate WS includes the display module or the display panel that is manufactured at (e.g., in or on) each (e.g., every) cell area CA, and the work protective film PF-W is connected to (e.g., is attached to) the work substrate WS to protect the cell areas CA.

As shown in FIG. 2B, an adhesive layer ADL (hereinafter, which may be referred to as a "temporary adhesive layer") is disposed between the work protective film PF-W and the work substrate WS. The temporary adhesive layer ADL may have a low adhesive force (e.g., a relatively low adhesive force) and a high viscoelasticity (e.g., a relatively high viscoelasticity) to minimize or reduce an amount of residual adhesive material remaining on the work substrate WS when the work protective film PF-W is removed from the work substrate WS. The temporary adhesive layer ADL may include, for example, a silicone-based and/or a urethane-based adhesive material.

The work substrate WS includes a peripheral area BA that is adjacent to the cell areas CA. For example, the peripheral area BA may correspond to a boundary area between the cell areas CA. In some embodiments, the peripheral area BA may correspond to a periphery of each of the cell areas CA. For example, in some embodiments, the peripheral area BA may surround (e.g., around a periphery of) each of the cell areas CA. The work protective film PF-W may include unit areas PF-CA corresponding to the cell areas CA, and a boundary area PF-BA corresponding to the peripheral area BA.

A cutting line CL-PF may be formed in the work protective film PF-W. The cutting line CL-PF may be formed using a laser beam while the work protective film PF-W and the work substrate WS are disposed on the stage 300, or the work protective film PF-W and the work substrate WS may be disposed on the stage 300 after the cutting line CL-PF is formed.

The work protective film PF-W may be divided into a plurality of areas by the cutting line CL-PF. For example, as shown in FIG. 2A, the work protective film PF-W may be divided into four boundary areas PF-BA and nine unit areas PF-CA, which are distinct (e.g., which are distinguishable) from each other. The cutting line CL-PF may be aligned with an outer boundary of the cell areas CA.

As shown in FIG. 2C, the cutting line CL-PF may extend to the temporary adhesive layer ADL. For example, the cutting line CL-PF may extend through the protective film PF-W to the temporary adhesive layer ADL. In some embodiments, the cutting line CL-PF may also extend partially through the adhesive layer ADL, such that the adhesive layer ADL may be partially cut. In this case, because the adhesive layer ADL may be partially cut, the adhesive layer ADL may be removed (e.g., may be easily removed) together with the boundary area PF-BA, when the boundary area PF-BA is removed.

Figure 3A:
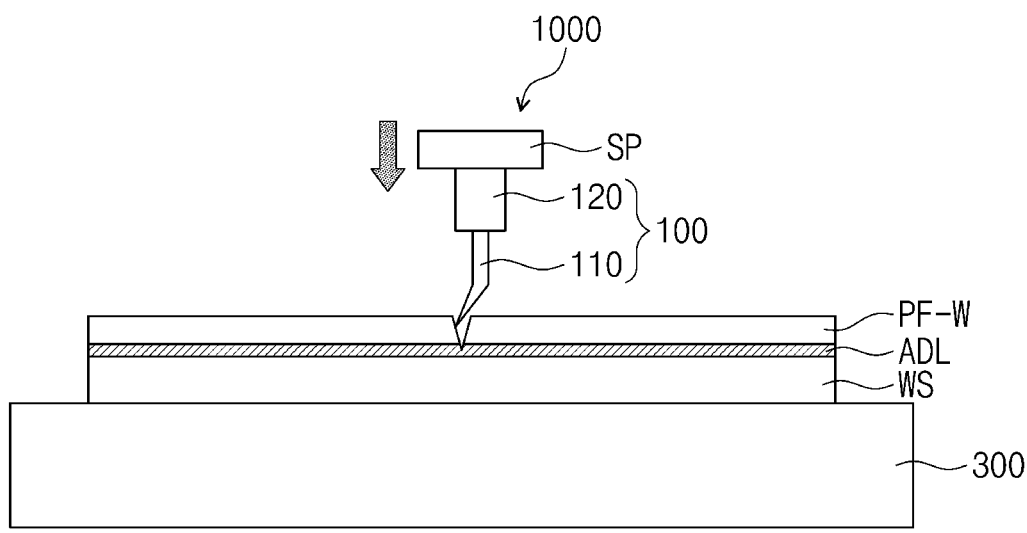
FIGS. 3A-3B are side views showing operations of a manufacturing apparatus of a display device according to an exemplary embodiment of the present disclosure.
Figure 3B:
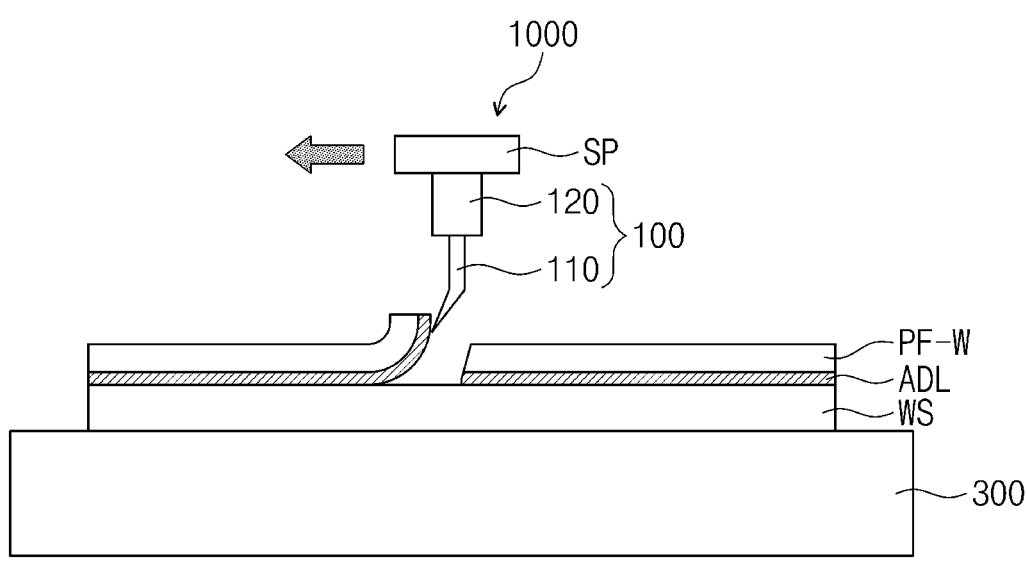
Figure 3C:
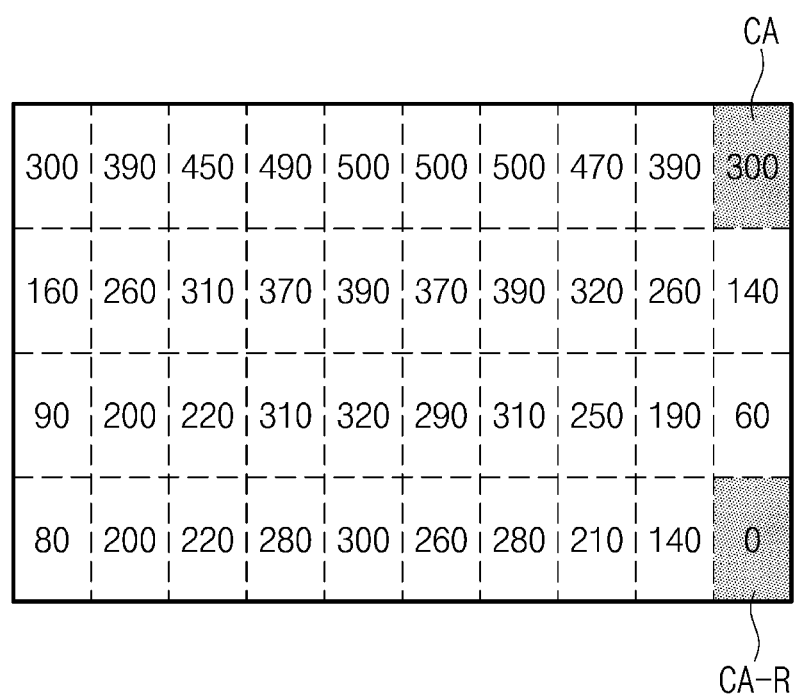
FIG. 3C is a plan view showing a height difference at various points of a work substrate.

FIGS. 3A and 3B are side views showing operations of a manufacturing apparatus 1000 of a display device according to an exemplary embodiment of the present disclosure. FIG. 3C is a plan view showing a height difference at various points of a work substrate. Hereinafter, in the following description with reference to FIGS. 3A to 3C, redundant description of the same or substantially the same elements and/or components as those described with reference to one or more of the above embodiments (e.g., the embodiment of FIG. 1) may not be repeated.

The controller 200 controls the driver SP, for example, such that the separation module 100 is moved towards the work substrate WS (e.g., the separation module 100 descends). The controller 200 may monitor the sensing signal from the pressure sensor 120, and may control the driver SP to control the movement of the separation module 100 according to the sensing signal. For example, the controller 200 may control the driver SP to descend the separation module 100 until the sensing signal corresponds to a reference signal.

In more detail, the controller 200 may control the position of the driver SP in the vertical direction according to (e.g., based on) the sensing signal. As shown in FIG. 3A, when the separation structure 110 contacts (e.g., makes contact with) the work protective film PF-W, a sensing signal corresponding to the contact is received. In this case, the sensing signal corresponding to the contact between the separation structure 110 and the work protective film PF-W may be different from the sensing signal before the contact therebetween. When the separation structure 110 is positioned to apply an appropriate pressure to the work protective film PF-W (e.g., to apply a suitable pressure for separating the work protective film PF-W), the controller 200 may stop the descending of the separation module 100. For example, when the intensity of the pressure is greater than or equal to a reference value, the controller 200 may stop a movement of the separation module 100 in the vertical direction.

Then, when the intensity of the pressure detected by the pressure sensor 120 is within a suitable or desired range (e.g., within a predetermined range), the controller 200 may move the driver SP in the horizontal direction as shown in FIG. 3B. In this case, the work protective film PF-W may be separated from the work substrate WS due to the movement of the driver SP (and thus, the movement of the separation structure 110) in the horizontal direction.

Table 1 below shows results according to an embodiment of the present disclosure, in which the boundary area PF-BA of the work protective film PF-W is separated using the manufacturing apparatus 1000 of the display device as shown in FIGS. 3A and 3B. In Table 1, a first point is defined as a point that is closer to a corresponding cell area CA than a second point, and the second point is defined as a point that is farther from the corresponding cell area CA than the first point. Further, in some embodiments, the stage 300 may not be completely flat. For example, there may be a height difference of about ±500 micrometers depending on areas (or regions) of the stage 300. The height difference may be measured from the ground. Accordingly, in some embodiments, there may be a height difference between the first and second points. Because the first point and the second point may have the height difference therebetween, the boundary area PF-BA at the first and second points may be separated or may not be separated under the same or substantially the same load (e.g., under the same pressure or the same force).

TABLE 1

| Load (kgf) | First point | Second point |
|---|---|---|
| 0.5 | Separation not possible | Separation not possible |
| 0.8 | Separation not possible | Separation not possible |

TABLE 1-continued

| Load (kgf) | First point | Second point |
| --- | --- | --- |
| 1.5 | Separation not possible | Separation not possible |
| 1.9 | Separation not possible | Separation possible |
| 2 | Separation not possible | Separation possible |
| 2.2 | Separation not possible | Separation possible |
| 2.6 | Separation possible | Separation possible |
| 3 | Separation possible | Separation possible |
| 3.5 | Separation possible | Separation possible |
| 4 | Damage occurrence | Damage occurrence |

As shown in Table 1, when the intensity of the pressure (e.g., the load) sensed by the pressure sensor 120 is greater than or equal to about 2.6 kgf, the boundary area PF-BA of the work protective film PF-W may be separated at the first and second points. When the intensity of the pressure sensed by the pressure sensor 120 is greater than or equal to about 4 kgf, the work substrate WS was damaged.

Referring to FIG. 3C, a height difference between a reference cell area CA-R and various points including the cell area CA is shown. For example, as shown in FIG. 3C, the separation module 100 has pressed the work protective film PF-W with a load of 2.6 kgf at forty (40) points on one work substrate WS. The same load was applied to the reference cell area CA-R and the other points including the cell area CA, and the height difference between the points are shown with respect to the reference cell area CA-R. For example, a difference in height of about 500 µm at maximum was measured, and the measurement results are shown in FIG. 3C. According to the present exemplary embodiment, because the separation module 100 does not descend by the same displacement at each of the points, and the separation module 100 descends until the same or substantially the same pressure-intensity is measured at the points, the boundary area PF-BA of the protective film PF-W may be separated equally even when the separation operation is performed at 40 points having a height variation (e.g., a height difference).

Figure 4A:
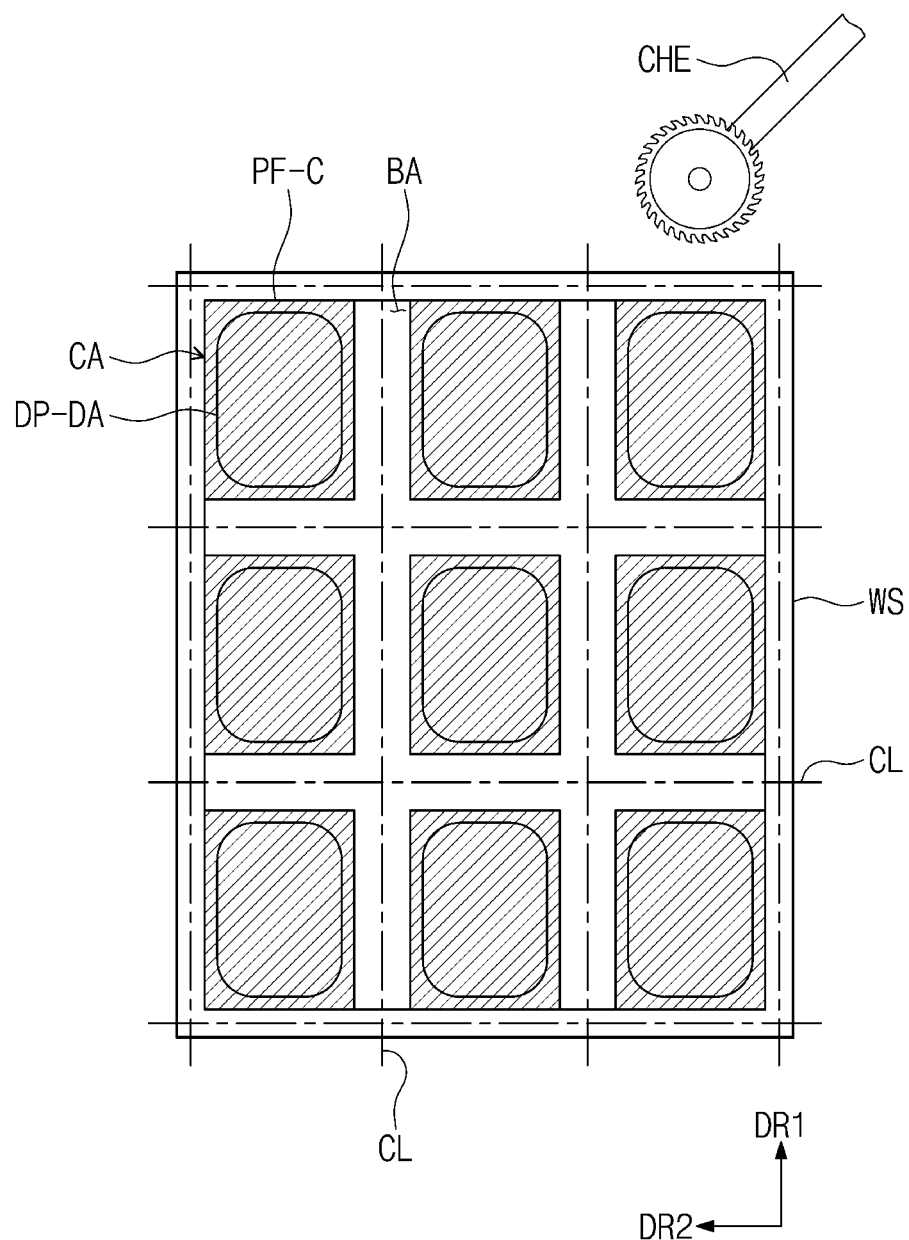
FIG. 4A is a plan view showing a processing operation of a manufacturing method of a display device according to an exemplary embodiment of the present disclosure.
Figure 4B:
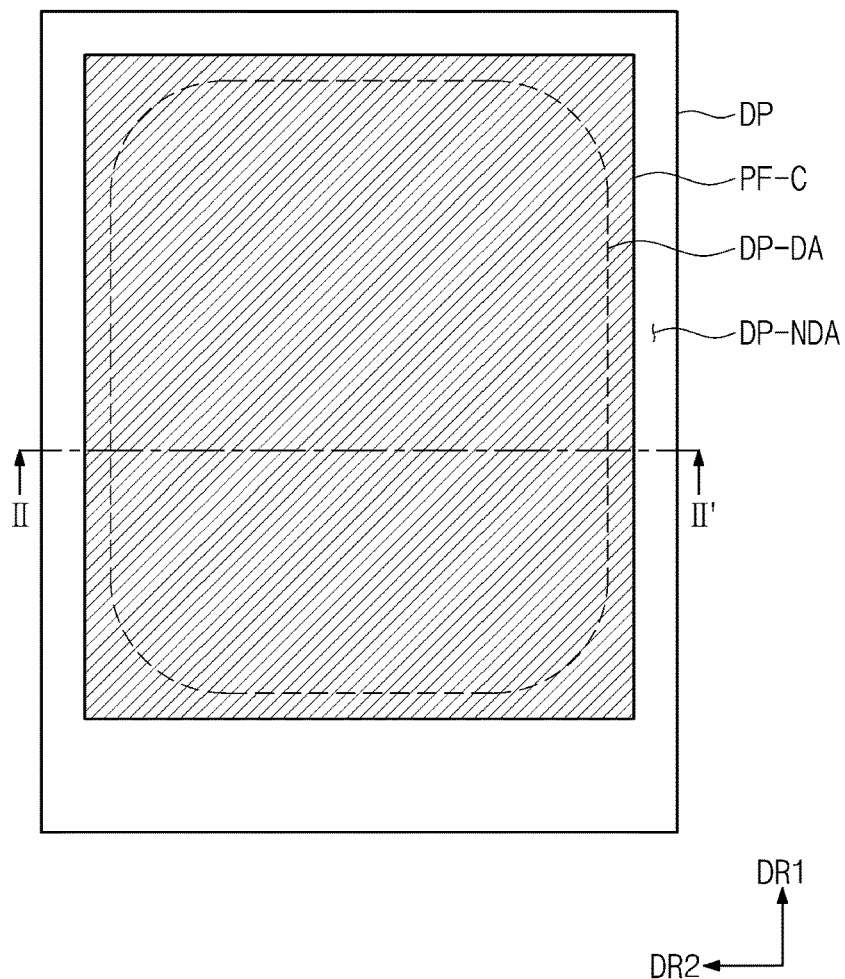
FIG. 4B is a plan view showing an enlarged area of FIG. 4A.
Figure 4C:
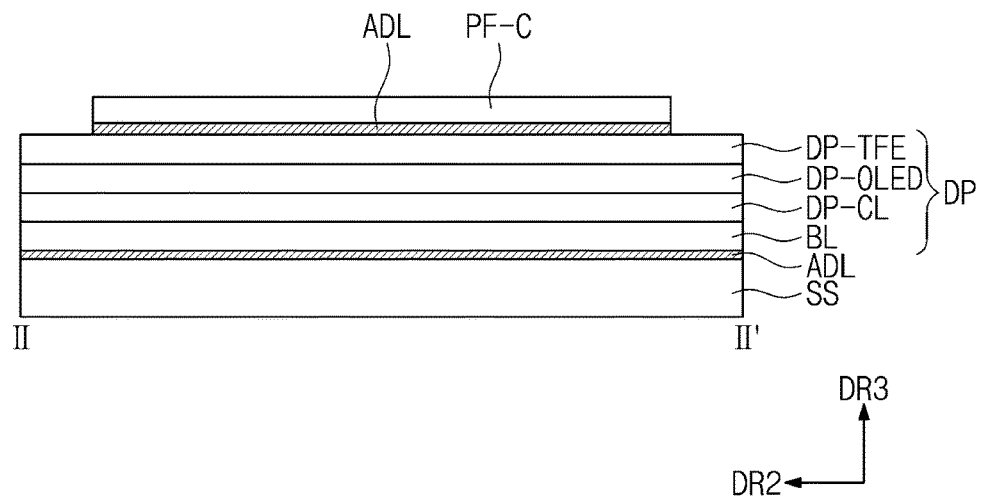
FIG. 4C is a cross-sectional view taken along the line II-II' of FIG. 4B.

FIG. 4A is a plan view showing a processing operation of a manufacturing method of a display device according to an exemplary embodiment of the present disclosure. FIG. 4B is a plan view showing an enlarged area of FIG. 4A. FIG. 4C is a cross-sectional view taken along the line II-II' of FIG. 4B.

When the operations described with reference to FIGS. 3A to 3C of the manufacturing apparatus 1000 of the display device are performed a plurality of times, the boundary area PF-BA (e.g., all of or an entirety of the boundary area PF-BA) of the protective film PF-W may be removed as shown in FIG. 4A. For example, the four boundary areas PF-BA shown in FIGS. 2A to 2C may be removed by performing the operations described with reference to FIGS. 3A to 3C of the manufacturing apparatus 1000 of the display device four times to remove the four boundary areas PF-BA.

In more detail, according to the present exemplary embodiment, the intensity of the pressure applied to the separation structure 110 may be measured at four points while the manufacturing apparatus 1000 of the display device performs the above-described operations four times. The separation structure 110 may be appropriately disposed at a target position at each separation point, even though the stage 300 may have a height difference (e.g., may not be flat). In an embodiment, the target position may be set in the vertical direction. The separation structure 110 may be prevented or substantially prevented from applying an overpressure (e.g., an excessive pressure) on the work substrate WS. The separation structure 110 may be disposed at a suitable position where the work protective film PF-W may be sufficiently separated in the vertical direction.

After the boundary area PF-BA is removed, the work substrate WS (e.g., as shown in FIG. 4A) is cut. For example, a cutting line CL may be determined (e.g., may be set) at (e.g., in or on) the peripheral area BA, and the work substrate WS may be cut along the cutting line CL using a cutting wheel CHE. Therefore, a plurality of display panels having a cell protective film PF-C connected (e.g., attached) thereto may be formed.

FIGS. 4B and 4C show one display panel DP from among the plurality of display panels of FIG. 4A. The display panel DP may have an area that is greater than that of the cell area CA shown in FIG. 2A. A portion of the display panel DP may be exposed without being covered by the cell protective film PF-C. For example, a periphery (e.g., an edge or a bezel) of the display panel DP may be exposed without being covered by the cell protective film PF-C. The display panel DP may include a base layer BL, a circuit element layer DP-CL, a display element layer DP-OLED, and an encapsulation layer DP-TFE.

The base layer BL may include at least one synthetic resin film. The base layer BL may include a glass substrate, a metal substrate, an organic/inorganic composite substrate, and/or the like. The circuit element layer DP-CL includes at least one insulating layer and a circuit element. The insulating layer includes at least one inorganic layer and at least one organic layer. The circuit element includes signal lines and a pixel driving circuit. The display element layer DP-OLED includes at least a plurality of organic light emitting diodes as light emitting elements. The display element layer DP-OLED may further include an organic layer, for example, such as a pixel definition layer. The encapsulation layer DP-TFE may include a plurality of inorganic layers. The encapsulation layer DP-TFE may further include an organic layer.

A further process may be carried out on the separated display panel DP. The base layer BL may be coupled to a support substrate SS by an adhesive layer ADL. The support substrate SS and the adhesive layer ADL may be removed after the manufacturing process of the display panel is completed.

Figure 5:
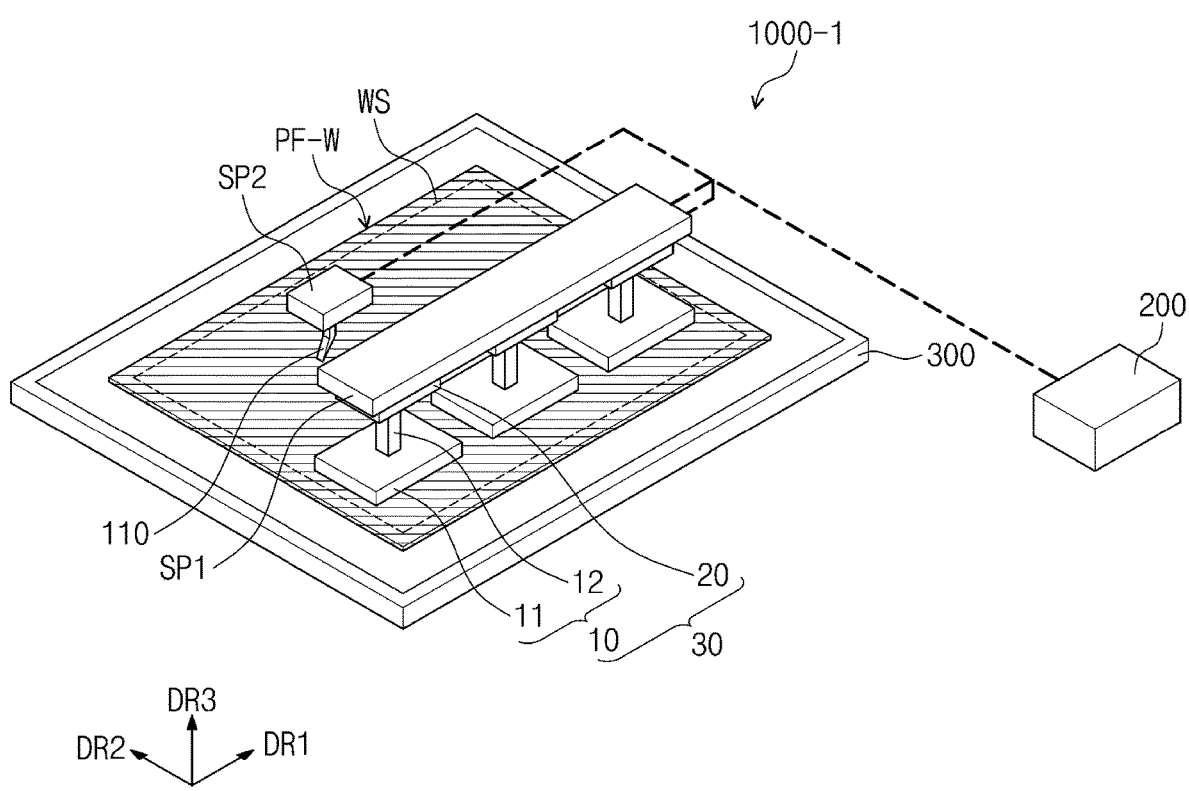
FIG. 5 is a perspective view showing a manufacturing apparatus of a display device according to an exemplary embodiment of the present disclosure.
Figure 6A:
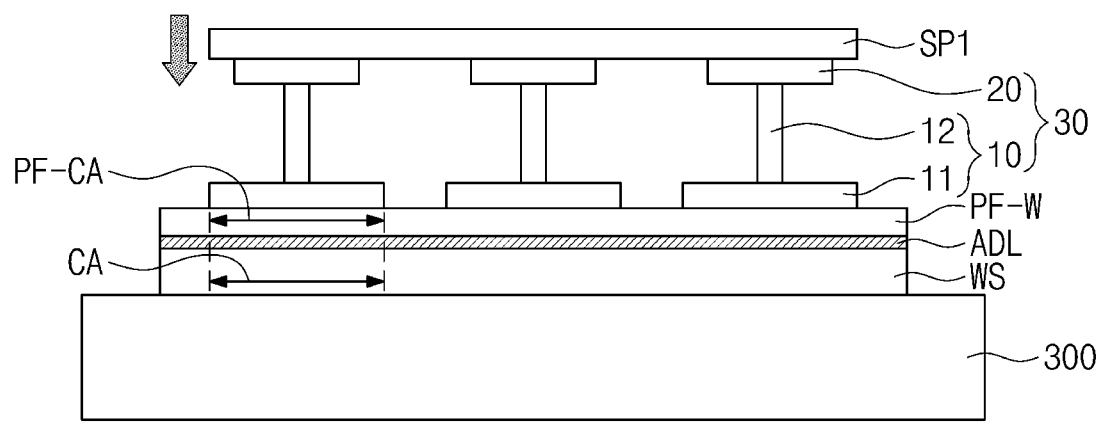
FIG. 6A is a side view showing an operation of a manufacturing apparatus of a display device according to an exemplary embodiment of the present disclosure.
Figure 6B:
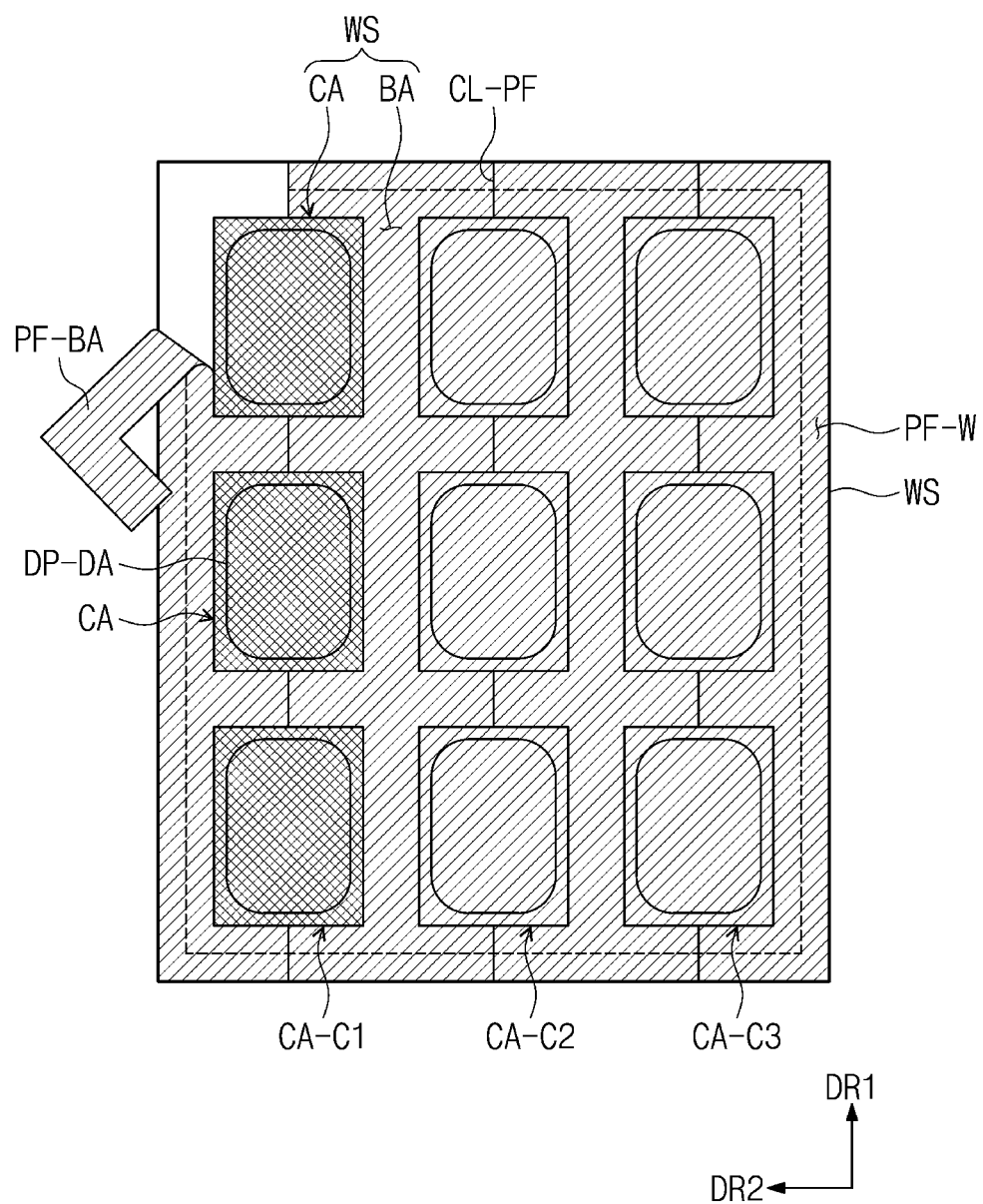
FIG. 6B is a plan view showing a processing operation of a manufacturing method of a display device according to an exemplary embodiment of the present disclosure.

FIG. 5 is a perspective view showing a manufacturing apparatus 1000-1 of a display device according to an exemplary embodiment of the present disclosure. FIG. 6A is a side view showing an operation of the manufacturing apparatus 1000-1 of the display device according to an exemplary embodiment of the present disclosure. FIG. 6B is a plan view showing a processing operation of a manufacturing method of the display device according to an exemplary embodiment of the present disclosure. Hereinafter, in the following description with reference to FIGS. 5, 6A, and 6B, redundant description of the same or substantially the same elements and/or components as those described with reference to one or more of the above embodiments (e.g., the embodiments of FIGS. 1 to 4C) may not be repeated.

The manufacturing apparatus 1000-1 of the display device includes a pressing module (e.g., a pressing apparatus) 30, a first driver SP1, a separation structure 110, a second driver SP2, a stage 300, and a controller 200. In the present exemplary embodiment, the separation structure 110 that is directly coupled to the second driver SP2 is shown as a representative example, but the present disclosure is not limited thereto, and the separation structure 110 may be coupled to a pressure sensor 120 (e.g., refer to FIG. 1).

The pressing module 30 includes a pressing member (e.g., a press) 10, and a pressure sensor 20 that measures an intensity of pressure applied to the pressing member 10. The pressing member 10 is disposed on a portion of a work protective film PF-W. The pressing member 10 may press the work protective film PF-W according to a pressure that does not damage the work substrate WS. In an exemplary embodiment, the pressing member 10 may include a pressure plate 11 and a connection bar 12. However, the present disclosure is not limited thereto, and a configuration of the pressing member 10 is not particularly limited. The pressure sensor 20 may be the same as or substantially the same as the pressure sensor 120 described with reference to FIG. 1.

FIGS. 5 and 6A show the manufacturing apparatus 1000-1 of the display device including three pressing modules 30 coupled to the first driver SP1 as a representative example. In this case, the three pressing modules 30 may be disposed to correspond to some of the cell areas CA from among the cell areas CA. However, the present disclosure is not limited thereto, and the manufacturing apparatus 1000-1 of the display device may include any suitable number of pressing modules 30 that are connected to the first driver SP1.

The controller 200 controls the first driver SP1 to control a movement of the pressing module 30. For example, the controller 200 may control the first driver SP1 such that the pressing module 30 descends. The controller 200 monitors a sensing signal from the pressure sensor 20. For example, the controller 200 controls the first driver SP1 to allow the pressing module 30 to descend when the sensing signal is less than a reference signal.

The controller 200 controls a position of the first driver SP1 according to (e.g., based on) the sensing signal. For example, the controller 200 may control a position of the first driver SP1 in the vertical direction according to the sensing signal. As shown in FIG. 6A, when the pressing module 30 contacts (e.g., makes contact with) the work protective film PF-W, a sensing signal corresponding to the contact is received. In this case, the sensing signal corresponding to the contact between the pressing module 30 and the work protective film PF-W may be different from the sensing signal before the contact therebetween. When the pressing module 30 is positioned to apply an appropriate pressure to the work protective film PF-W, the controller 200 stops the descending of the pressing module 30. For example, when the intensity of the pressure is greater than or equal to a reference value, the controller 200 may stop a movement of the pressing module 30 in the vertical direction.

Then, the controller 200 controls the second driver SP2 to control a movement of the separation structure 110. For example, the controller 200 may control the second driver SP2 such that the separation structure 110 descends. The separation structure 110 may be moved horizontally after the separation structure 110 descends by a desired or suitable amount (e.g., a predetermined amount). As shown in FIG. 6B, a portion of the work protective film PF-W may be separated by the horizontal movement of the separation structure 110.

In more detail, referring to FIG. 6B, the three pressing modules 30 may be arranged to correspond to the cell areas CA arranged at (e.g., in or on) a first column CA-C1 from among the cell areas CA arranged in the 3 by 3 matrix as the representative example. In this case, one boundary area PF-BA that is adjacent to the cell areas CA arranged at (e.g., in or on) the first column CA-C1 is separated. Because the pressing module 30 holds (e.g., presses) unit areas PF-CA, only the boundary area PF-BA may be separated by the horizontal movement of the separation structure 110. Accordingly, stress may be prevented or substantially prevented from being applied to the unit areas PF-CA in the horizontal direction during the separation process.

The three pressing modules 30 may be moved to press cell areas CA arranged at (e.g., in or on) a second column CA-C2, and cell areas CA arranged at (e.g., in or on) a third column CA-C3. The separation of the boundary area PF-BA may be carried out while the three pressing modules 30 are moved to press the corresponding cell areas CA arranged at the corresponding columns CA-C2 and CA-C3.

In some embodiments, the stage 300 may not be completely flat (e.g., due to the height difference). According to the present exemplary embodiment, the intensity of the pressure applied to the pressing member 10 may be measured three times while the descending operation of the pressing modules 30 is performed three times. Although the stage 300 may not be flat, the pressing member 10 may be appropriately disposed at a target position at each descending point. The target position may be set in the vertical direction. In this case, an overpressure caused by the pressing module 30 may be prevented or substantially prevented from being applied to the work substrate WS.

According to one or more of the above described embodiments, the intensity of the pressure applied to the separation structure 110 may be measured after the separation structure 110 contacts (e.g., makes contact with) the work substrate WS. The separation structure 110 may be accurately disposed at a target position at each separation point even though the stage is not flat (e.g., due to the height difference). The target position may be set in the vertical direction. Accordingly, an overpressure caused by the separation structure 110 may be prevented or substantially prevented from being applied to the work substrate WS. The separation structure 110 may be disposed at a suitable position in the vertical direction to sufficiently separate the protective film.

The pressing module 30 is disposed at (e.g., in or on) the areas (e.g., the unit areas) of the work protective film. The areas of the work protective film at (e.g., in or on) which the pressing module 30 is disposed may overlap with the cell areas CA, respectively. The unit areas are not separated when the boundary area of the work protective film is removed, because the pressing module 30 presses (e.g., and/or holds) the unit areas. The pressure applied to the work substrate WS is monitored (e.g., is continuously monitored) such that the work substrate WS is not excessively pressed (e.g., overly pressed) by the pressing module 30.

The electronic or electric devices and/or any other relevant devices or components (e.g., the controller 200) according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the exemplary embodiments of the present disclosure.

Although various exemplary embodiments of the present disclosure have been described, it will be understood that the present disclosure is not to be limited to these exemplary embodiments, and that various changes and modifications may be made as understood by one of ordinary skill in the art, all without departing from the spirit and scope of the present disclosure.

Therefore, the disclosed subject matter should not be limited to any single embodiment described herein, and the spirit and scope of the present disclosure shall be defined according to the attached claims, and their equivalents.

What is claimed is:

1. A manufacturing apparatus of a display device, comprising:
   a stage to support a work substrate covered by a work protective film;
   a separation module comprising a separation structure, and a pressure sensor to measure an intensity of a pressure applied to the separation structure;
   a driver to control a position of the separation module; and
   a controller to control the separation module and the driver,
   wherein the separation module is configured to move in a direction parallel to a surface of the work substrate.

2. The manufacturing apparatus of claim 1, wherein the work substrate comprises a plurality of cell areas, and a peripheral area adjacent to the cell areas.

3. The manufacturing apparatus of claim 2, wherein each of the cell areas comprises a base layer, a circuit element layer, a display element layer, and an encapsulation layer.

4. The manufacturing apparatus of claim 1, wherein an adhesive layer is between the work protective film and the work substrate.

5. The manufacturing apparatus of claim 4, wherein a cutting line is defined in the work protective film.

6. The manufacturing apparatus of claim 5, wherein the cutting line extends to the adhesive layer.

7. The manufacturing apparatus of claim 5, wherein the work protective film is divided into a plurality of areas by the cutting line.

8. The manufacturing apparatus of claim 1, wherein the pressure sensor comprises a piezoelectric element.

9. The manufacturing apparatus of claim 1, wherein the controller is configured to:
   receive a sensing signal indicating the intensity of the pressure from the pressure sensor; and
   control a position of the driver in a vertical direction according to the sensing signal.

10. The manufacturing apparatus of claim 9, wherein the controller is configured to move the driver in a horizontal direction when the intensity of the pressure is within a predetermined range.

11. A method of manufacturing a display device, comprising:
    providing a work substrate covered by a work protective film;
    moving a separation module in a vertical direction, the separation module comprising a separation structure, and a pressure sensor to measure an intensity of a pressure applied to the separation structure;
    measuring the intensity of the pressure;
    stopping the movement of the separation module in the vertical direction when the intensity of the pressure is equal to or greater than a reference value; and
    moving the separation module in a horizontal direction.

12. The method of claim 11, wherein:
    the work substrate comprises a plurality of cell areas, and a peripheral area adjacent to the cell areas;
    the work protective film comprises a plurality of unit areas at the cell areas, and a boundary area at the peripheral area, the plurality of unit areas and the boundary area being divided by a cutting line; and
    the boundary area of the work protective film is removed according to the moving of the separation module in the horizontal direction.

13. The method of claim 12, wherein the boundary area comprises a plurality of areas.

14. The method of claim 11, further comprising cutting the work substrate to divide the work substrate into a plurality of cell areas of the work substrate.

15. A manufacturing apparatus of a display device, comprising:
    a stage to support a work substrate covered by a work protective film;
    a pressing module comprising a pressing member, and a pressure sensor to measure an intensity of a pressure applied to the pressing member;
    a first driver to control a position of the pressing module;
    a separation structure;
    a second driver to control a position of the separation structure; and
    a controller to control the pressure sensor, the first driver, and the second driver.

16. The manufacturing apparatus of claim 15, wherein:
    the work substrate comprises a plurality of cell areas, and a peripheral area adjacent to the cell areas; and
    the pressing module comprises a plurality of pressing modules over at least some of the cell areas.

17. The manufacturing apparatus of claim 15, wherein the work protective film is divided into a plurality of areas by a cutting line.

18. The manufacturing apparatus of claim 15, wherein the pressure sensor comprises a piezoelectric element.

19. The manufacturing apparatus of claim 15, wherein the controller is configured to:
    receive a sensing signal indicating the intensity of the pressure from the pressure sensor; and
    control a position of the first driver in a vertical direction according to the sensing signal.

20. The manufacturing apparatus of claim 19, wherein the controller is configured to move the second driver when the first driver is stopped in the vertical direction.

* * * * *